Patented Aug. 4, 1953

2,647,821

UNITED STATES PATENT OFFICE 2,647,821

PROCESS OF PREPARING BERYLLIUM OXIDE

Henry C. Kawecki, Temple, Pa., assignor to The Beryllium Corporation, a corporation of Delaware No Drawing. Application February 28, 1947, Serial No. 731,723

2 Claims. (Cl. 23—140)

The present invention relates to the production of beryllium oxide and more particularly to a process of preparing the same involving the conversion of beryllium hydroxide into the beryllium basic acetate and thereafter decomposing the acetate and recovering the beryllium as the oxide free from the impurities normally associated with the hydroxide.

Heretofore various procedures have been employed or suggested for recovering beryllium in the form of its oxide from beryl and other beryllium-containing ores. These prior processes all require many tedious operations in order to separate the beryllium from iron, silica, aluminum and other impurities with which it occurs in the ore, and even then, as beryllium is now produced commercially, small but objectionable amounts of iron, aluminum and other impurities will be present in the final beryllium oxide product which is used as the starting material in obtaining metallic beryllium or beryllium-containing alloys by known processes.

It is an object of the present invention to prepare beryllium oxide of an exceptionally high purity with elimination of many of the tedious wet process steps heretofore considered essential.

Various other objects and advantages of the invention will become apparent as the description proceeds.

The invention in its broader aspects is predicated upon my observation that beryllium basic acetate, $BeO \cdot 3Be(C_2H_3O_2)_2$, when vaporized and the vapors are heated to a suitable temperature in the presence of air or another oxidizing medium, will burn to form BeO, carbon dioxide, and water vapor. This fact, taken in conjunction with the known fact that beryllium basic acetate may be vaporized and recondensed without decomposition, suggests the possibility of utilizing the above reaction and the indicated behavior of the basic acetate to effect a separation of the beryllium content of a mixture of impure beryllium hydroxide and the customary mineral impurities and thereafter converting the separated acetate into pure beryllium oxide.

While the indicated behavior of beryllium basic acetate makes it possible to bring about a wide variety of separations of beryllium from its association with other elements by converting the beryllium into the form of the basic acetate and then distilling the acetate away from the nonvolatile mineral impurities, and I intend to include all such separations within the scope of the appended claims, I shall hereinafter describe my invention with particular relation to the treatment of beryllium hydroxide as it is recovered in the so-called fluoride process and which in such state contains varying but nevertheless substantial amounts of alumina, silica and iron oxide as impurities.

The beryllium hydroxide cake obtained in the fluoride process is partially dried and then reacted with acetic acid added in a proportion 25–50% in excess of theory. The reaction will be speeded up by boiling for one-half hour with stirring. The excess of acetic acid may be recovered by condensation and reused. The mixture resulting from the reaction, being moist, is then dried. After the mass has been thoroughly dried, it is further heated to a temperature of between 330° C. and 350° C. to distill off the basic acetate while the acetates of the impurities are decomposed. The basic acetate vapors are led to a cold chamber or condenser, where they condense and fall down as fine crystals. In order to insure the desired purity, the recovered basic acetate crystals may be redistilled. Care should be taken in the distilling and redistilling steps not to heat the basic acetate to a temperature at which decomposition will occur.

Thereafter the purified basic acetate is again volatilized and the resulting vapors are mixed with air and burned to form beryllium oxide. It may be advantageous to introduce an inflammable gas into the combustion chamber to supply additional heat for maintaining the reaction. The dust of beryllium oxide is led to a bag-type dust collector or other suitable dust recovery apparatus. By carrying on the burning or decomposition of the acetate while the acetate is in the vapor state, it will be understood that little or no opportunity is afforded for the beryllium oxide to pick up any impurities from the refractories of the combustion chamber or other apparatus used in effecting the decomposition, such as would occur in the prior practice of forming beryllium oxide from the impure hydroxide. This is a factor that also contributes to the desired end result in the described preferred method of practicing the invention.

The recovered beryllium oxide is of an extremely high purity and therefore lends itself to new uses besides being a particularly desirable starting material for the production either of metallic beryllium or beryllium-containing alloys according to known methods.

While I have specified burning of the basic acetate in air and the simplicity of this operation and the equipment employed commend themselves where large-scale commercial operations are contemplated, it will be understood that the decomposition of the acetate to form beryllium oxide and decompose and eliminate the acetic acid component may be carried out with other oxidizing agents or under other conditions favorable to the decomposition of the acetate. It will moreover be understood that the essential reactions may be carried out under widely varying operating conditions and with diverse types of apparatus, and that various changes in the details of the procedure may be made without departing from the invention, which is not to be deemed as limited otherwise than as indicated by the scope of the appended claims.

I claim:

1. The process of preparing beryllium oxide of high purity substantially free from the impurities consisting essentially of iron and aluminum normally associated with beryllium compounds derived from beryllium ore which comprises converting said relatively impure beryllium compound into the form of a beryllium basic acetate product, subjecting the resulting beryllium basic acetate product to distillation at a temperature within the range of about 330° to 350° C. whereby acetates of said impurities present in the product are decomposed, separating the beryllium basic acetate vapors from the decomposition products of said decomposed acetates, and thereafter burning the separated beryllium basic acetate in the vaporized state in the presence of air to form beryllium oxide of high purity.

2. The process of preparing beryllium oxide of high purity substantially free from the impurities consisting essentially of iron and aluminum normally associated with beryllium hydroxide derived from beryllium ore which comprises reacting said relatively impure beryllium hydroxide with acetic acid and thereby forming a beryllium basic acetate product, drying the resulting beryllium basic acetate product, subjecting the dried beryllium basic acetate product to distillation at a temperature within the range of about 330° to 350° C. whereby acetates of said impurities present in the product are decomposed, separating the beryllium basic acetate vapors from the decomposition products of said decomposed acetates, and thereafter burning the separated beryllium basic acetate in the vaporized state in the presence of air to form beryllium oxide of high purity.

HENRY C. KAWECKI.

References Cited in the file of this patent

UNITED STATES PATENTS

| Number | Name | Date |
|---|---|---|
| 1,967,235 | Ferkel | July 24, 1934 |
| 2,399,687 | McNabb | May 7, 1946 |

OTHER REFERENCES

Thorpe's "Dictionary of Applied Chemistry," 4th ed., vol. VI, page 20, Longmans, Green and Co., New York, N. Y. (1943).

Urbain et al., Comp. Rend., vol. 133, pp. 874–876 (1901).

Kling et al., Bull. Soc. Chim. de France, vol. 15 (4 series), pp. 205–210 (1914).